Nov. 8, 1966 C. A. GONGWER 3,283,737
JET PROPULSION DEVICE FOR WATER VEHICLE
Filed May 3, 1963 8 Sheets-Sheet 1

INVENTOR.

BY CALVIN A. GONGWER

ATTORNEY

INVENTOR.
BY CALVIN A. GONGWER
ATTORNEY

Nov. 8, 1966   C. A. GONGWER   3,283,737
JET PROPULSION DEVICE FOR WATER VEHICLE
Filed May 3, 1963   8 Sheets-Sheet 3

INVENTOR.
BY CALVIN A. GONGWER
ATTORNEY

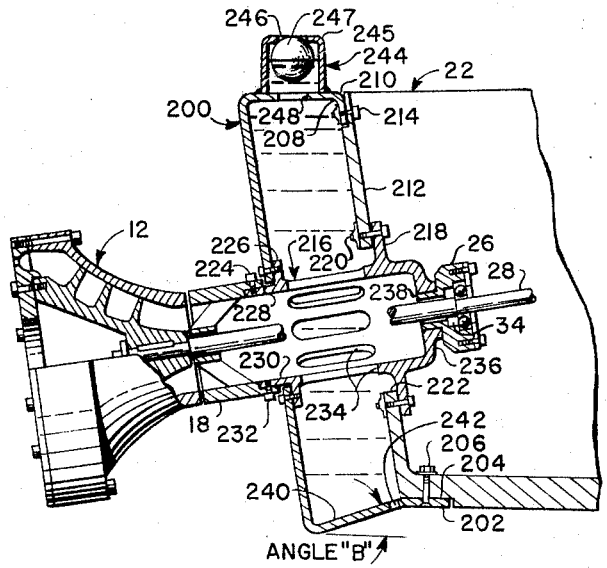

Nov. 8, 1966   C. A. GONGWER   3,283,737
JET PROPULSION DEVICE FOR WATER VEHICLE
Filed May 3, 1963   8 Sheets-Sheet 5
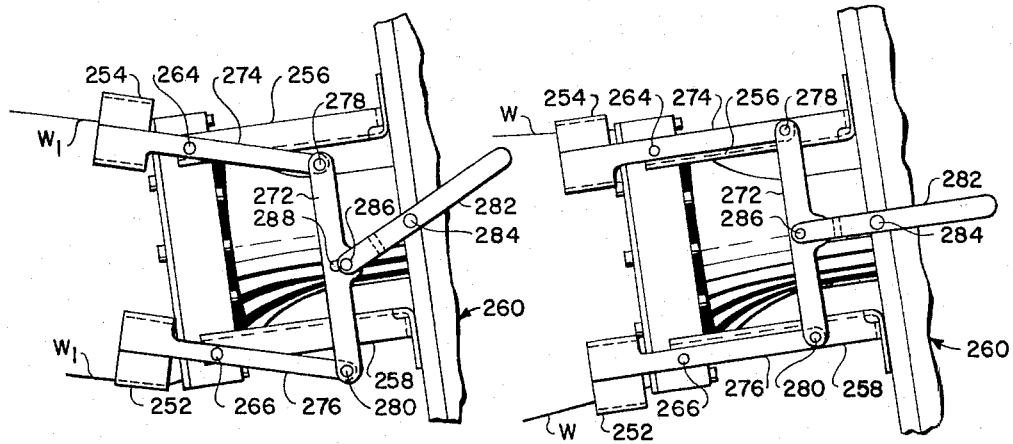
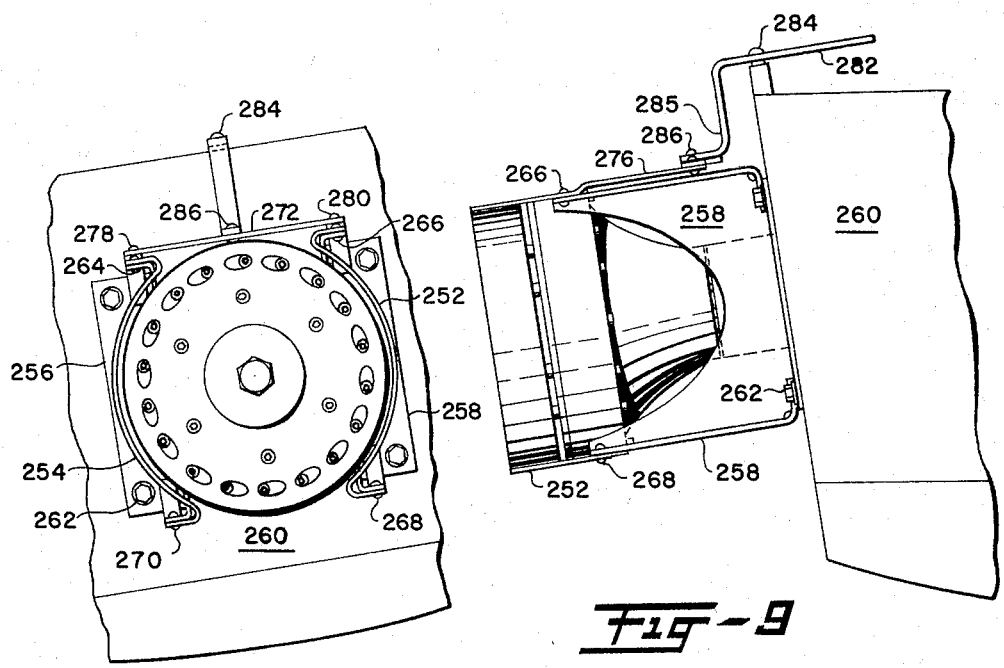
INVENTOR.
BY CALVIN A. GONGWER
ATTORNEY

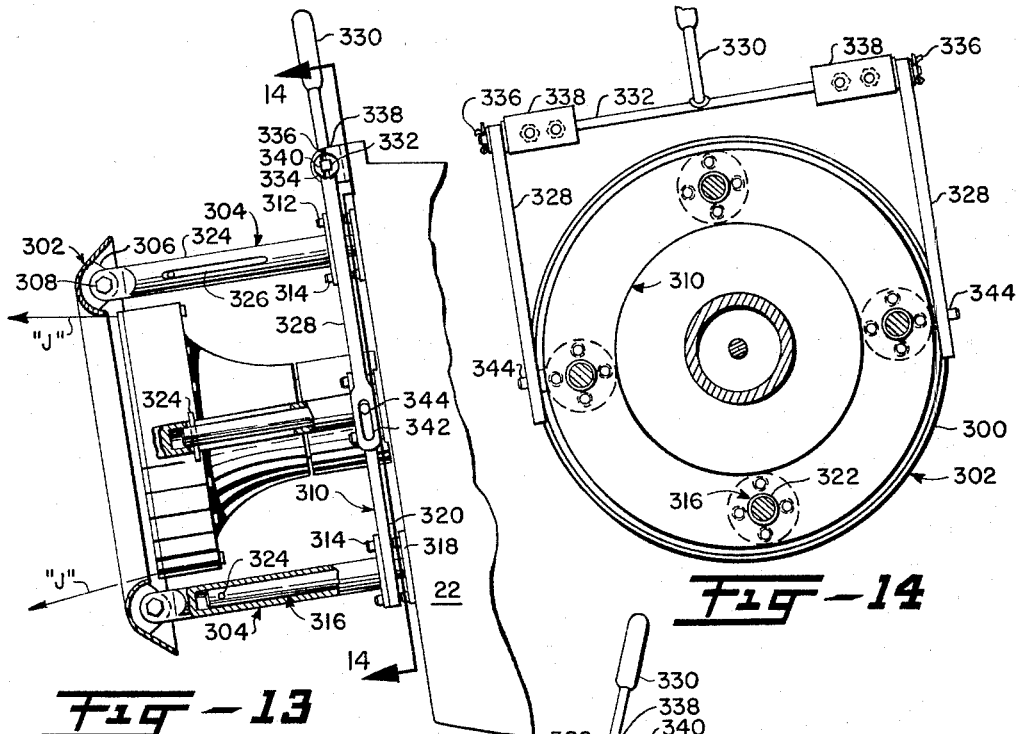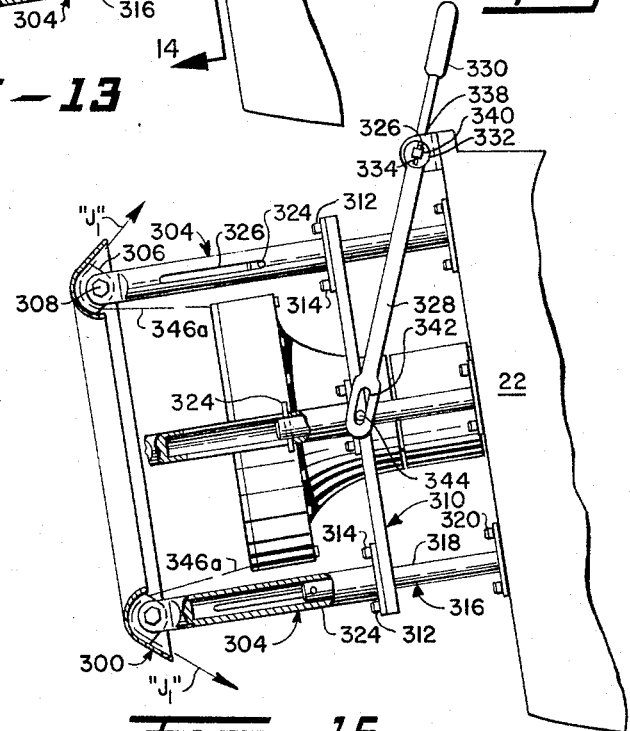

Nov. 8, 1966  C. A. GONGWER  3,283,737
JET PROPULSION DEVICE FOR WATER VEHICLE
Filed May 3, 1963  8 Sheets-Sheet 7

INVENTOR.
CALVIN A. GONGWER
BY Edward O. Ansell
ATTORNEY

Nov. 8, 1966   C. A. GONGWER   3,283,737
JET PROPULSION DEVICE FOR WATER VEHICLE
Filed May 3, 1963   8 Sheets-Sheet 8

INVENTOR.
CALVIN A. GONGWER
BY Edward O. Ansell
ATTORNEY

United States Patent Office 3,283,737
Patented Nov. 8, 1966

3,283,737
JET PROPULSION DEVICE FOR WATER VEHICLE
Calvin A. Gongwer, Glendora, Calif., assignor, by mesne assignments, to Aerojet-General Corporation, El Monte, Calif., a corporation of Ohio
Filed May 3, 1963, Ser. No. 280,188
2 Claims. (Cl. 115—16)

This invention relates to propulsion through a fluid medium in general and more particularly to vehicles adapted for propulsion along the surface of a body of water.

This is a continuation in part of my copending application, Serial No. 20,897, filed April 8, 1960, now abandoned.

The physical limitations of present forms of propulsion embodying marine propellers prevent high propulsive efficiency and hence form a barrier to the limit of water vehicle velocity. Efficiency fall-off at high speed from propellers is caused by cavitation which is the vaporization of a liquid caused by local pressure reduction due to dynamic action. This phenomenon is characterized by the formation of a vapor pocket in the interior or on the boundaries of the rapidly moving stream of liquid. The cavity of water vapor forms and collapses in a regular sequence and causes erosion, vibration, and noise.

Associated equipment used in combination with marine propellers, such as rudders or other steering devices, creates a frictional loss and reduces the propulsive efficiency of the system. Complex power reducers and direction reversers comprising complex forms of gears and fluid transmissions operating with marine propellers further reduce efficiency and raise the cost of the total power plant system. This efficiency problem can be alleviated by adopting a hydraulic jet propulsion in the form of a pump system positioned above the water line of a water vehicle and by scooping water into a duct and directing the water in a rotating impeller within the pump that restricts it at the discharge orifice to increase the pressure inside the impeller just ahead of the orifice. The pressure is converted to spouting velocity in the orifice and is directed rearwardly and counter-rotationwise. The form of the pump eliminates a stationary casing since the impeller, housing, and orifice plate are integral and rotate as a unit, reducing the friction loss found in stationary casings. Vanes formed on the impeller are set at an angle that does not constitute a complete volute form, and these vanes direct the discharge of liquid so as to cancel somewhat the peripheral velocity of the impeller. By eliminating the stationary casing and volute of a conventional pump, large losses encountered in converting the high speed discharge from the impeller into a pressure head in the conventional spiral volute are eliminated. This loss constitutes nearly the entire loss in ordinary centrifugal pumps. Also, by locating the pump housing and impeller above the water line of the vehicle, they will be free from the drag or resistance of any water which would occur in the ordinary submerged marine propeller.

Therefore, it is the principal object of the present invention to provide improved means for obtaining hydraulic jet propulsion of a water vehicle without the occurrence of cavitation, vibration, and noise.

It is another object of this invention to provide a novel mechanism for deflecting the direction of a liquid jet stream which acts as a source of propulsion for a water vehicle in order to change the direction of movement of the propelled vehicle.

It is a further object of this invention to provide a novel mechanism which is effective to reverse the direction of movement and slow or stop the forward or rearward movement of a liquid jet propelled water vehicle by means of a reversing element inserted into the liquid jet stream of a pump on the water vehicle used for the propulsion thereof.

Still another of this invention is to provide a novel liquid jet-propelled water vehicle, wherein an outboard motor for a water vehicle is combined with a pump in such a way that the water vehicle is propelled by the action of a liquid jet stream.

Briefly the invention relates to an integrally rotated impeller, casing, and exhaust orifices pumping liquid from a large body and thereafter exhausting it to effect hydraulic jet propulsion of a water vehicle. Direction of the vehicle can be regulated by deflecting the direction of the jet flow by adjustable plates or the direction can be reversed, slowed, or stopped by subjecting the jet flow to a channel-shaped annulus.

In the accompanying drawings, forming a part of this specification, and in which like numerals are employed to designate like parts throughout the same:

Figure 1:
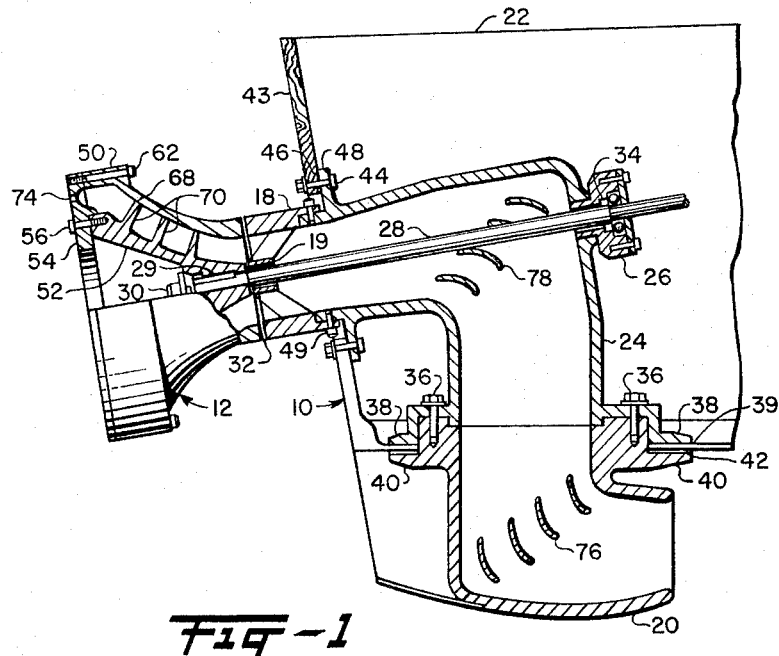
FIG. 1 is a central vertical longitudinal section of the hydraulic jet propulsion pump embodying a preferred form of the invention.
Figure 4:
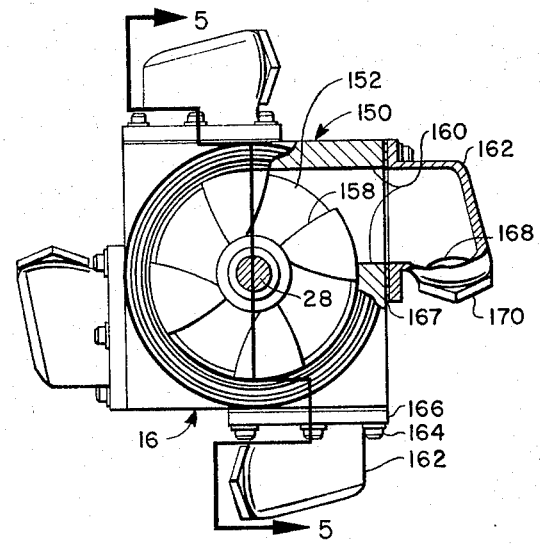
FIG. 4 is a cross sectional view of the pump through the tubular body portion taken on line 4—4 of FIG. 3 and showing a partial sectional view through one of the exhaust nozzles.
Figure 5:
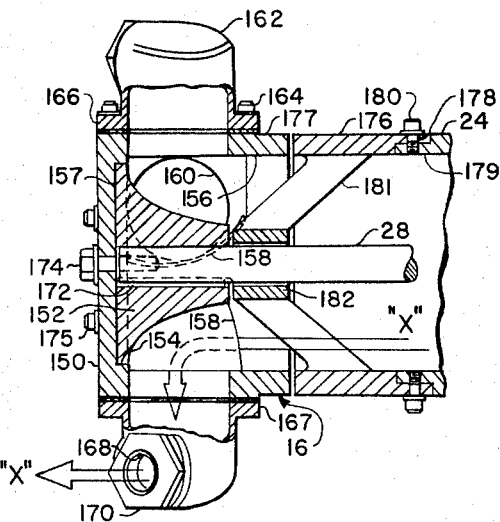
Figure 6:
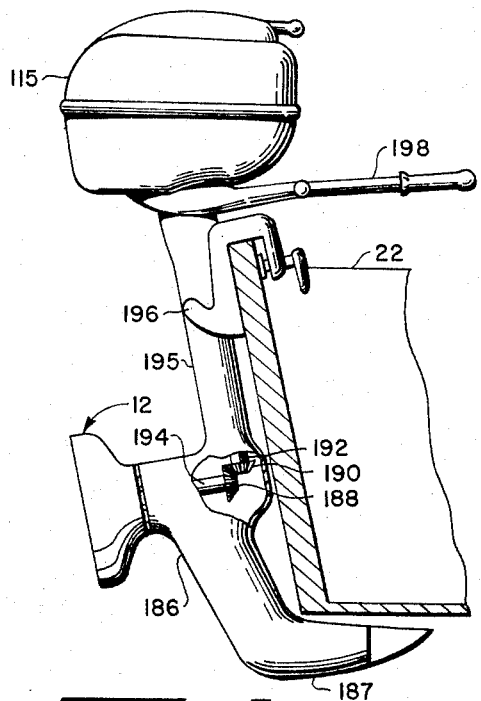
Figure 16:
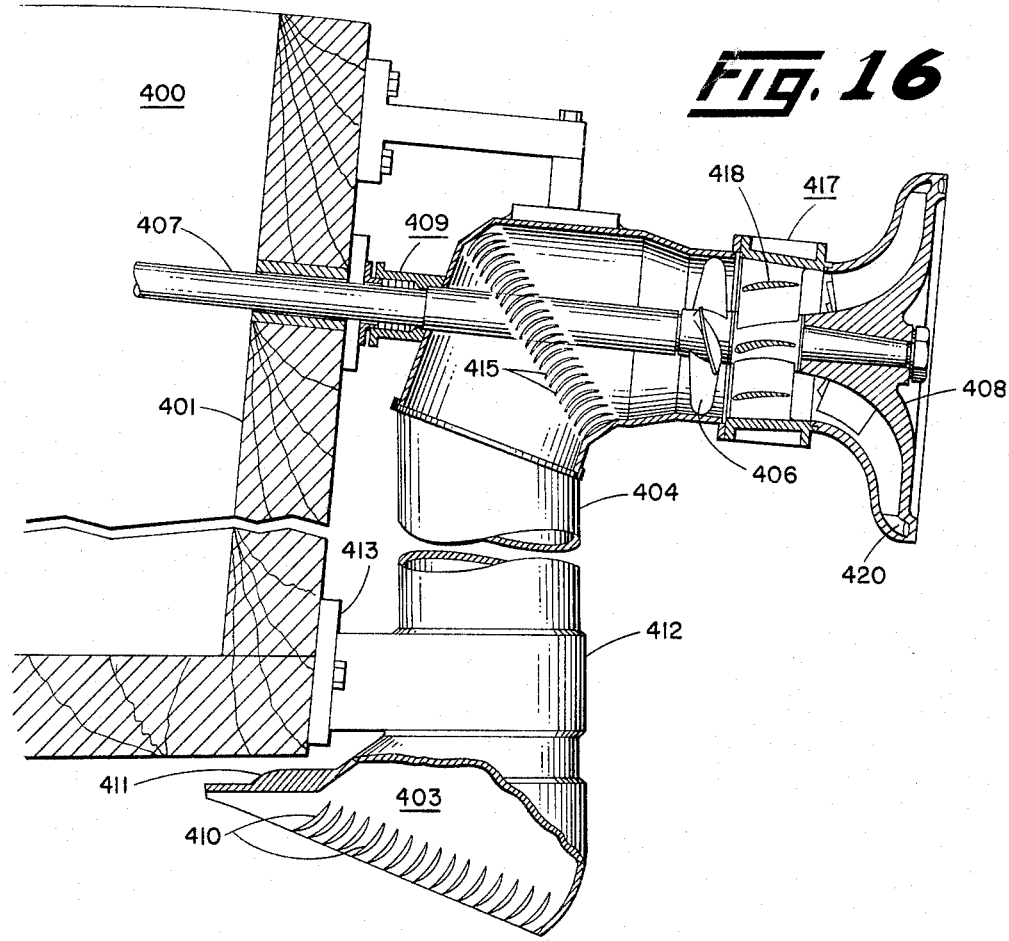

FIG. 5 is a cross sectional view through the pump body taken substantially along line 5—5 of FIG. 4, FIG. 6 is a side elevation of the preferred pump of the invention adapted to a conventional outboard motor attached to the transom of a conventional boat, FIG. 7 is a bottom view of the preferred form of the pump shown in FIG. 1, wherein the pump is provided with a transom reservoir, FIG. 8 is a cross sectional view through the pump body and transom reservoir portion, taken on line 8—8 of FIG. 7, FIG. 9 is a side elevation of the pump shown in FIG. 1 and wherein the pump is provided with deflecting plates and associated operating means, FIG. 11 is a plan view of FIG. 9, FIG. 12 is a plan view of FIG. 9 with the deflecting plates being pivoted to an operating position, FIG. 13 is a side elevation of the preferred pump illustrated in FIG. 1 wherein the pump is provided with a reversal channel positioned outside the jet stream of liquid discharged from the pump, FIG. 14 is a cross sectional view taken on line 14—14 of FIG. 13, FIG. 15 is a side elevation similar to FIG. 13, but showing the reversal channel operatively acting to transpose the direction of the jet stream of liquid discharged from the pump, with the reverse channel assembly being partially shown in vertical cross section, FIG. 16 is a longitudinal sectional view, with portions thereof shown in elevation, of another embodiment of the invention.

Figure 17:
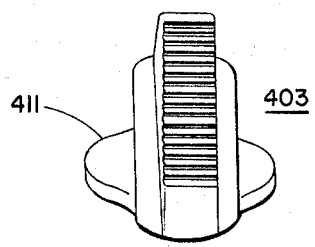
Figure 18:
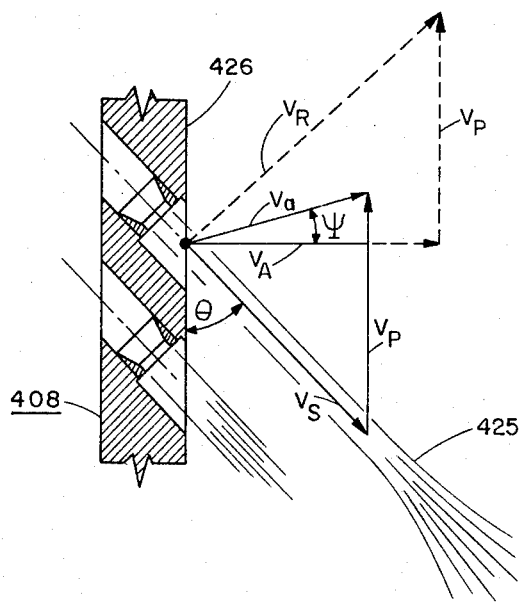
Figure 19:
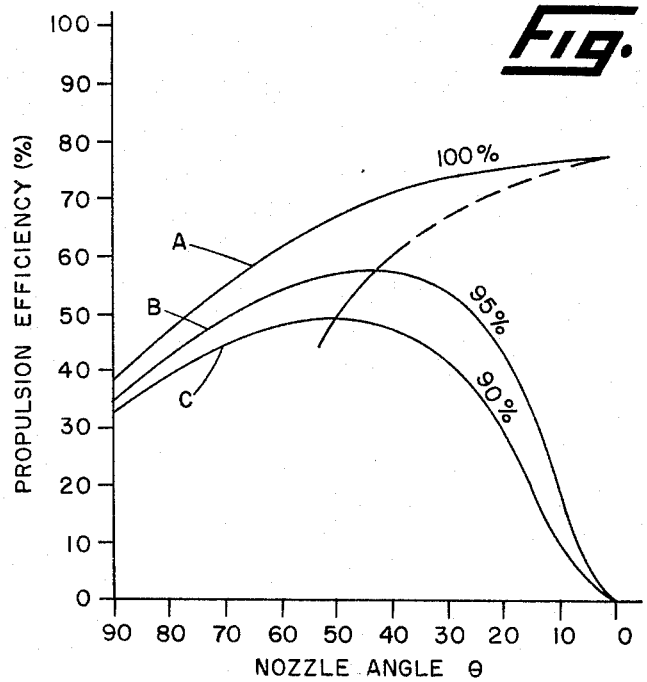

FIG. 17 is an isometric view of one of the components of the embodiment of FIG. 16, FIG. 18 is a vector diagram of nozzle forces, and FIG. 19 is a graphical presentation of the influence of the canting of the nozzles on propulsive efficiency.

With reference now to the figures, the hydraulic jet propulsion device 10 illustrated in FIG. 1 is comprised of four main parts: the nozzle assembly 12, the bearing section 18, the scoop or inlet 20, and the transition duct 24.

Nozzle assembly 12 illustrated in FIG. 1 is the preferred form of pumping element. Nozzle assembly 12, bearing section 18, and scoop or inlet 20 are positioned outside the boat, hull, or body 22 with the nozzle assembly also being positioned above the water line of the vehicle where it is free from the drag or resistance of any water. The components inside the boat body 22 are the transition duct 24 and bearing assembly 26.

Nozzle assembly 12 is driven through the motor shaft 28 from a conventional power source (not shown) and fixedly attached thereto by a key 29 and the nut 30. Examples of suitable power sources are gasoline internal combustion engines, diesel engines, electric motors, turbines, etc., all well known in the art. A small clearance gap 32 is provided between the rotatable nozzle assembly 12 and the stationary bearing section 18 to eliminate friction. A flap type seal (not shown) may be placed over the gap 32 to prevent water leakage if desired. The motor shaft 28 is supported by bearing 19 at the rear section and by bearing assembly 26 at the forward section. Bearing assembly 26 has a water tight seal 34 incorporated therein for purposes of preventing water from entering the interior of the boat body 22.

Transition duct 24 and scoop 20 are fixedly attached by bolts 36 that clamp the boat bottom 39 between flanges 38 and 40. Gasket 42 is installed between the boat bottom 39 and flanges 38 and 40 to insure water tight integrity.

Transition duct 24 is also bolted to the transom 43 of the boat body 22 by bolts 44, and a gasket 46 is inserted between transom 43 and the flange 48 to insure a watertight fit therebetween. Bolts 49 fixedly attach the bearing section 18 to the transition duct 24 to constitute a duct between the inlet 20 and the nozzle assembly 12.

Figure 2:
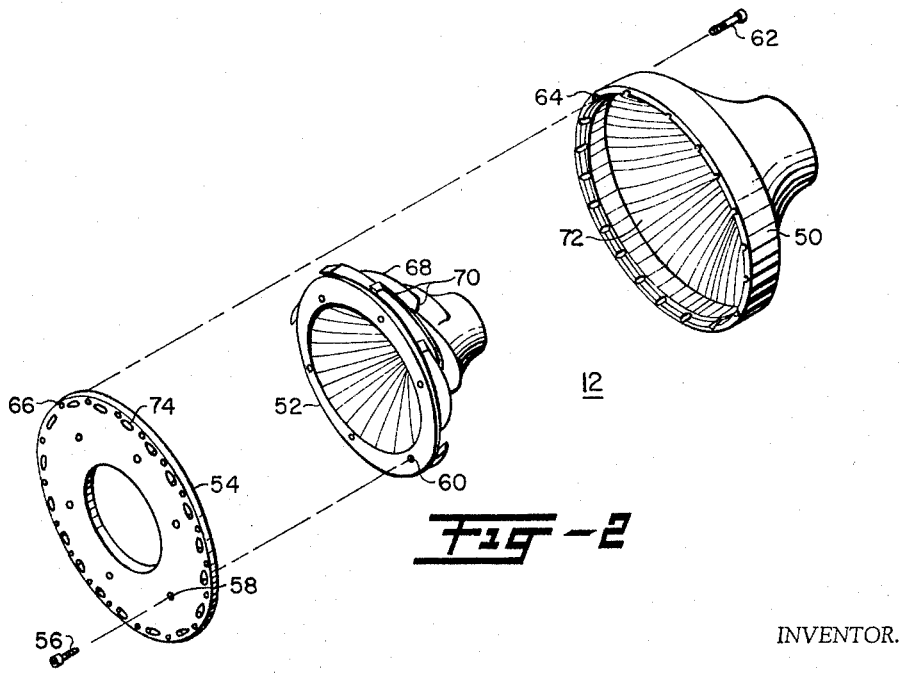
FIG. 2 is an exploded view of the pump head shown in FIG. 1.

The exploded view in FIG. 2 illustrates the integral form of the nozzle assembly 12 having three basic parts: the bell-shaped housing 50, the impeller 52, and the orifice plate 54. They are bolted together by the bolts 56 passing through the holes 58 into the threaded openings 60. In a like manner, the bolts 62 pass through the openings 64 in the housing 50 into the threaded openings 66 of the orifice plate 54 to form an integral rotating unit. In the assembled position, the peripheral faces 68 of the vanes 70 abut the inner surfaces 72 of the housing 50. It is possible to make the housing 50 a nonrotatable element and still not depart from the present invention. In the present form, the rotated casing 50 reduces the friction drag on the centrifuge liquid which flows in the passageways between the vanes 70.

The operation of the hydraulic jet propulsion device illustrated in FIGS. 1 and 2 is as described in the following: Upon the rotation of the nozzle assembly 12 by a power source (not shown), a partial vacuum is formed within the transition duct 24. Priming may be necessary at times when a partial vacuum cannot be created, since the scoop or inlet 20 is below the water line of the boat body 22, the vacuum raises the water in the transition duct 24, and the water is sucked into the rotating impeller 52. The vanes 70 of the impeller 52 force the water under pressure out the orifice holes 74 in the orifice plate 54. To compensate for the swirling of the jets of water issuing from the orifice plate 54, the restricted orifice holes 74 are drilled in a direction opposite to the direction of rotation at an angle of approximately 38° to the orifice plate surface. This directs the water jets issuing from the clockwise rotating orifice holes 74 in a counterclockwise direction and therefore greatly reduces any water jet swirl. The inclination of the orifice holes 74 my be at any desired angle and still be operative.

The combined water jets issuing rearwardly from the nozzle assembly 12 impart a considerable amount of forward thrust to the nozzle assembly 12 and hence to the boat body 22. This propulsion of the boat hull is produced by the forwardly directed forces of the reaction resulting from the rearward discharge of the jet (a high-speed stream of liquid) through a nozzle or orifice. As the velocity of the boat body 22 increases from the thrust imparted to it by the water jet, the efficiency increases due to the ram action of the scoop or inlet 20 through the water. Increased velocity forces more water into the scoop or inlet 20, which raises the pressure within the transition duct 24 and hence increases the pressure and efficiency, causing more thrust to be issued from the rear of the hydraulic jet propulsion device.

Deflecting vanes 76 and 78 smooth out the water flow through the scoop 20 and the transition duct 24 when the entire device is at operating speed.

Figure 3:
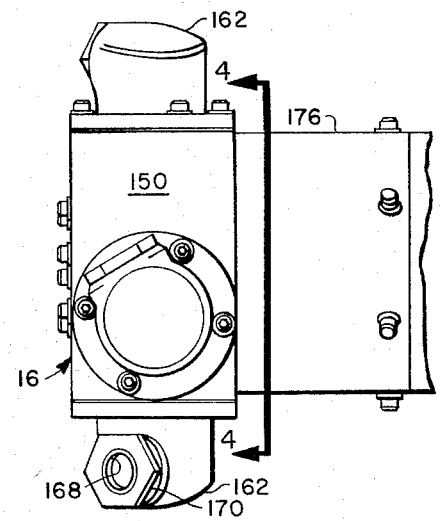
FIG. 3 is a side elevation of another hydraulic jet propulsion pump embodying the invention.

An alternate form of nozzle assembly 16 is illustrated in FIGS. 3, 4, and 5. This modification allows a slight amount of tangential movement of the centrifuged liquid before the direction is diverted rearwardly by four orifice nozzles.

A generally oblong housing 150 of a square cross section snugly receives an impeller 152 within the bores 154 and 156 and abuts the housing recess 157. A plurality of vanes 158 radiate from the hub of the impeller 152 which has a generally volute shape in both its plan and side elevations, as shown in FIGS. 4 and 5. A plurality of exit channels 160 allow centrifuged liquid to be emitted tangentially from the impeller 152. A plurality of nozzles 162 are fixedly attached by the bolts 164 through the nozzle flanges 166 in the housing 150. Gaskets 167 preserve water tightness between the nozzles 162 and the housing 150. Channels 160 are contiguous with the inside diameter of nozzles 162 offering a smooth flow passage. Nozzles 162 have exit orifices 168 that are canted at approximately 38° to the longitudinal axis of the impeller. The cant angle is comparable to the inclination of the orifice holes 74 in the nozzle assembly 12 of FIG. 1. This mode of nozzle assembly 16 directs four jet streams rearwardly in contrast to the complete annulus of orifice exhaust as in the nozzle assembly 12 of FIGS. 1 and 2. Replaceable nozzle restrictors 170 are threadedly received by the nozzles 162 to afford a changeable diameter for the exit orifices 168 and a changeable shape of the lip. This change in nozzle shape would allow a multiple number of spouting velocities and exhaust jet stream shapes for varied conditions and purposes.

Shaft 28 positively rotates impeller 152 through the key 172 and further binds the impeller 152 and the housing into an integral rotated assembly by the bolt 174 received through the threaded opening in the shaft 28. A plurality of bolts 175 fixedly attach the housing 150 to the impeller 152.

Bearing housing 176 is in juxtaposition to the portion 177 of the housing 150 and is fixedly attached to the transition duct 24 by the flange 178 overlapping flange 179 of the duct 24 with suitable bolts 180 securing the flanges 178 and 179 together. A sealing agent or gasket may be inserted between flanges 178 and 179 to preserve water tightness. Spokes 181 radiate inwardly and rearwardly, converging to support the bearing 182 that further supports shaft 28.

In operation, the liquid flow through the nozzle assembly is characterized by flow line "X" in FIG. 5. Liquid is pumped through the impeller and centrifuged into the nozzles 162. The flow is diverted into the canted nozzle positions, which are generally rearwardly, to result in a plurality of liquid jet streams to produce forward propulsion of the boat body 22.

FIG. 6 illustrates the adaptation of a conventional outboard motor 115 for a water vehicle to the novel nozzle assembly of the present invention, wherein the nozzle assembly operates through an externally positioned transition duct 186 and a scoop or inlet 187. Bevel gears 188 and 190 angularly transfer the rotative power from the motor shaft 192 to the nozzle power shaft 194. A one piece overall casing 195 surrounds the motor shaft 192, transition duct 186, and scoop or inlet 187 for convenience sake. The casing 195 may be formed or constructed in any convenient manner. Since the power source and nozzle assembly are a single integral unit and entirely outside the boat body 22, the inclination in the vertical plane of the jet stream can be adjusted by pivoting the unit on the brackets 196. Movement of the arm 198 pivots the jet stream and changes the vehicle direction as in a conventional outboard motor.

In FIGS. 7 and 8, the nozzle assembly 12 and bearing support 18 are supported by a reservoir device operating without a scoop. The reservoir 200 extends vertically and horizontally across the full height and length of the transom 212. The reservoir 200 allows the water vehicle to operate successfully in water too shallow for a conventional outboard motor or the nozzle assembly 12 operating in combination with the scoop or inlet 20 (FIG. 1). Any suitable sheet metal, casting, or forged construction may be adapted for the reservoir 200. Flange 202 nests within the recess 204 and extends across the bottom and side of the boat body 22. Flange 208 similarly nests in recess 210 of the transom 212 and is held in sealing engagement therein against a suitable sealing agent by the bolts 214.

Intake duct 216 is generally cylindrical in configuration and is received within reservoir 200. Duct 216 is supported at its forward end by flange 218 fixedly attached to the transom 212 by bolts 220. Duct 216 extends rearwardly through opening 222 in transom 212. Bolts 224 extending through the rear of the reservoir 200 fixedly connect the flange 226 of the duct 216 to the reservoir 200. Opening 228 of the reservoir 200 allows the spout 230 of the duct 216 to be engaged with the step flange on the bearing support 18 and to be fixedly attached thereto by the bolts 232. A plurality of oval shaped passageways 234 in the cylindrical portion of duct 216 conveys the liquid to the nozzle assembly 12. The closed end 236 of the duct 216 contains an opening 238 that receives and supports the bearing assembly 26. Shaft 28 is supported by bearing assembly 26, while a seal 34 keeps the rotating unit water-tight.

The bottom 240 of the reservoir 200 is inclined at an angle of B° which may be varied to gain optimum results. An inclination of 20° has been found to be successful, although other angulations could be used with success. A plurality of inlets 242 are made in the reservoir 200 and are positioned in line and adjacent to the transom 212.

Float valve assembly 244 is fixedly attached to the top of the reservoir 200. Valve housing 245 has contained therein a sphere 247 made of cork or other floatable material. Sphere 247 operates between a cylindrical opening 246 in the uppermost portion of the valve housing 245 and the cylindrical opening 248 in the uppermost portion of the reservoir 200. An opening is required in the reservoir 200 as an escape for entrapped air, but the float valve assembly 244 aids in creating a vacuum at starting and to plug the air escape to prevent water from spurting out the opening during running conditions.

The nozzle assembly 12 and reservoir 200 combination may be operated with or without priming. Upon rotation of the shaft 28, a partial vacuum will be formed by the rotating nozzle assembly 12 also causing a vacuum to be formed in the reservoir 200. Inlets 242 being below the water line allow water to rise in the reservoir 200 until it enters the openings 234 and feeds the rotated nozzle assembly 12. Water is allowed to rise in the reservoir 200 until the level reaches the sphere 247 whereupon it will float and seal the opening 246.

Advantages of using the reservoir 200 are principally to allow the water craft to enter shallow water without being starved. Also the craft could operate effectively in rough water conditions that would allow it to bounce off the water, permitting inlets 242 to be above the water line. The continuous water supply prevents sudden shocks and stresses when the unit is loaded or unloaded with water. During operating conditions, the water immediately below the reservoir bottom 240 is bled off through the inlets 242 removing a portion of the drag from the reservoir assembly.

The boat steering mechanism illustrated in FIGS. 9, 10, 11, and 12, operates by deflecting the water jet W to the right or to the left. The boat steering mechanism is adaped to operate on all the embodiments of the nozzle assemblies illustrated in FIGS. 1 through 6. The deflection is accomplished by the use of two curved deflecting plates 252 and 254.

The arcuately shaped deflector plates 252 and 254 are supported by two support brackets 256 and 258 mounted rigidly to the transom of the boat 260 by bolts 262. The deflector plates 252 and 254 are pivotally mounted to the aft end of the support brackets 256 and 258 at pivot points 264, 266, 268, and 270. The plates 252 and 254 are pivotally connected to each other by tie-bar 272 which connects the upper levers 274 and 276 of the deflector plates 252 and 254 at pivot points 278 and 280. Handle 282 is mounted to the boat 260 at pivot point 284 with its lower end 285 pivotally connected through a slot 288 to the tie-bar 272 at pivot point 286.

As shown in FIG. 11, the handle 282 is in the neutral or intermediate position causing the deflector plates 252 and 254 to remain clear of the water jet W.

Referring to FIG. 12, when the handle 282 is pivoted counter-clockwise, the deflector plates 252 and 254 are caused to rotate clockwise about the pivot points 264, 266, 268, and 270. This causes the right-hand deflector plate 252 to rotate into the water jet W and deflect it as shown by the lines $W_1$ while the left-hand deflector plate 254 remains clear of the deflected water jet $W_1$.

In like manner, a turn to the right (operator's right, facing the bow) is accomplished by pushing the handle 282 in a clockwise direction. Conventional types of automatic mechanisms can be used in combination with handle 282 to constantly exert a force upon it while executing a turn. The conventional type of outboard steering mechanism can be adapted for a steering wheel type of drive as employed in front operated steering mechanisms for motor vehicles.

The thrust reverser illustrated in FIGS. 13, 14, and 15 consists of a circular metal channel 300 mounted on four guide tubes 304 by means of brackets 306 and bolts 308. The respective opposite ends of the guide tubes 304 are fixedly attached to a circular ring plate 310 by means of circular base plates 312 and bolts 314. Each guide tube has a corresponding guide rod 316 fixedly attached to the aft end of the hull 22 by means of circular base plate 318 and bolts 320. Holes 322 are provided in the circular ring plate 310 to permit guide rods 316 to slip freely inside guide tubes 304.

Slidable assembly 302 is actuated by levers 328 and handle 330 which are secured together by rod 332 having its square ends fitted into the square apertures 334 at the upper ends of levers 328. Levers 328 are retained on rod 332 by cotter pins 336 which extend through the rod 332 at each end thereof. Rod 332 is secured to the aft end of boat body 22 by means of brackets 338 which also serve as bearings for the rod. The levers 328 are used to pivot about respective points 340 when the handle 330 is pushed aft or pulled forward.

The lower ends of levers 328 have elongated slots 342 slidably receiving pins 344 which are fixedly attached to the circular ring plate 310. As illustrated in FIG. 15, pivoting handle 330 forwardly or rearwardly will cause the slidable assembly 302 to move respectively to the extended position as in FIG. 15 or to the retracted position of FIG. 13.

As illustrated in FIG. 13, the outline of the water jet, represented by the arrows J, is cleared by the circular ring channel 300 when the slidable assembly 302 is in the retracted position. Thus, no diversion of the water jet J takes place, and no thrust reversing action is produced. However, if the handle 330 is pulled forward as seen in FIG. 15, the slidable assembly 302 moves aft and places the circular ring channel 300 within the water jet 346a and the water jet is diverted and reversed in direction, as indicated by the arrows $J_1$. The reversed direction of thrust now tends to slow, stop, or reverse the direction of movement of the boat 22. By manipulation of the handle, the position of the circular ring channel 300 can be positioned in order to clearly reverse the boat or to merely stop or slow its advance in recognition of the operator's desire.

In FIG. 16, an alternate embodiment of the invention is shown in the form of an impeller propulsive device attached externally to a vessel 400 at the transom 401 thereof. The components of the device include a scoop 403, a conduit section 404, and inducer means 406 attached to shaft 407 to which there is also attached impeller means 408. Scoop 403 includes a plurality of vanes 410, which are spaced across the inlet end area of scoop 403, and aeration plate 411, which is shown in greater detail in FIG. 17. When placed in a position for operation, scoop 403 is spaced a distance from the hull bottom sufficient to permit small debris and air to escape between the upper side of the aeration plate 411 and the boat bottom and around the outer periphery of conduit 404 and scoop 403. The major portion of the weight of the device when in operation is carried by pivotable support 412 and flange 413, the flange 413 being attached to the transom 401 of the vessel 400. The flange 413 may be attached in any of a variety of manners to conduit 404, one manner being by collars which substantially surround the conduit or duct 404. Shaft 407 extends through a stuffing box assembly 409 which is carried by the conduit section 404. The stuffing box assembly 409 supports the shaft 407 for rotation therewithin, while providing a seal about the shaft 407 adjacent the transom 401 to prevent water from leaking into the vessel 400 along the shaft 407. Vanes 410 of scoop 403 serve a dual function of intercepting and directing water upward into the conduit 404 from where it is induced through the impeller 408, and at the same time conserving the total head of the incoming water by converting the velocity head to a pressure head. Another vane function is that of preventing debris from entering the conduit 404 by providing a screening function which eliminates the need for independent screen material.

At the turn of conduit 404 in the vicinity of shaft 407, a second set of or plurality of vanes 415 are provided for directing the flow of water more uniformly toward the inducer 406. Water flows upward through the conduit 404, past vanes 415, and then through a stationary housing 417 which has stationary vanes 418 for straightening the flow of water into the impeller 408. The stationary housing 417 also carries a support bearing for the shaft 407 and the impeller 408.

The hydraulic jet propulsive device of the present invention is superior to other turbopropulsive devices in many respects among which is an equivalent or greater power output because the present device is substantially lighter in weight and is comprised of considerably fewer parts, as compared to other turbopropulsive devices. Power output is also derived from only a single stage in the present device. The addition of the single inducer 406 at a selected location upstream from the impeller 408 makes it possible to improve the performance of the present device considerably. The inducer 406 improves performance during periods of low suction pressure within the conduit 404. The inducer 406 also provides an additional impelling force and a more uniform axial flow of water toward the impeller 408 and aids in priming.

Included in the impeller 408 is a closed peripheral gallery 420, and adjacent to the gallery 420 is a ring of nozzles or orifices which are canted counter-rotationwise so as to make an angle with the face of the impeller 408.

The ring of nozzles or orifices in the embodiment of FIG. 16 and their configuration and direction are similar to the nozzle or orifice arrangements of other embodiments which have been previously described. In all embodiments, the nozzles are canted to the rearward face of the impeller at angles determined to give optimum propulsive efficiency. As will be described in conjunction with FIG. 18, the angle $\theta$ of canting is more properly referred to or related to the peripheral velocity of the nozzle ring, since canting is done primarily to provide a counter velocity to the rotary velocity force component imparted to the water discharged from the impeller. In the embodiment of FIG. 16, the rotation of the closed gallery 420 with the nozzle ring permits use of the velocity of the water to provide propulsion without the dual conversion encountered in conventional centrifugal pumps, where the velocity head is converted to a static head in the usual spiral volute and thereafter reconverted to a velocity head in the propulsion nozzle or nozzles.

In FIG. 18, a liquid jet 425 being discharged from one nozzle is shown, and the velocities imparted to the jet are illustrated in vector form. Vector $V_S$ represents the direction and velocity imparted to the water because of the particular configuration and orientation thereof. Rotary motion of the impeller imparts a second velocity to the water being discharged from the nozzle, namely a peripheral velocity represented in amount and direction by vector $V_P$. If the nozzles were aligned parallel to the axis of rotation of the impeller, a different vector $V_S'$ indicated in dashed lines, perpendicular to the impeller face 426 would be required. Adding vector $V_P$ vectorially to the different vector $V_S'$ would provide a resultant vector $V_R$ at an angle to the impeller face which is indicative of the considerable loss of thrust that would be sustained. The orifices or nozzles therefore should be inclined to the impeller face at angle $\theta$ which provide optimum efficiency. In FIG. 19, curves representing propulsive efficiency plotted against nozzle angle $\theta$ show that optimum propulsive efficiency is obtained for values of $\theta$ in a range of from substantially 30 degrees to substantially 70 degrees.

Referring again to FIG. 18, the peripheral velocity $V_P$, is subtracted vectorially by drawing it parallel to the impeller face to determine the absolute velocity, $V_a$, which makes the angle $\psi$ with the axial direction. Component $V_A$ of $V_a$ is the axial or propulsive component, while component $V_T$ is the absolute tangential component. The tangential component is responsible for the overall torque on the impeller and must exist to some finite value for there to be an overall torque on the system. That is, the system cannot accept power from the engine without the existence of the resisting torque represented by $V_T$. If angle $\psi$ is kept at a low value, this tangential component represents a small energy fraction. The existence of jet whirl due to the tangential component is negligible in relation to the advantages obtained by use of the device for propulsive force.

The inclusion of an inducer impeller of a propeller type and a stator row of vanes, as in the embodiment of FIG. 16, is of great assistance during take off of a hydrofoil boat or a planing boat. By raising the pressure at the eye of the impeller 408, the inducer 406 serves to reduce the whirl component, $V_T$, in the discharge jet thereby making angle $\psi$ smaller. Since the whirl losses vary as the square of $V_T$, small reductions above approximately 10° have considerable effect. However, below 10° the effect is must less. Also, the resistance to cavitation is increased by the inducer 406. The seal at the interface between the impeller 408 and the stationary housing 417 is kept under positive pressure by use of the inducer 406 and thus air leakage inward is prevented. The combination of the impeller 408, stationary vanes 418, and the inducer 406 promotes ease of priming the device. Cavitation losses are minimized in the inducer 406 by having the blading thereof thinned to the greatest extent possible. The influence on efficiency of the nozzle angle $\theta$ is indicated in the curves shown in FIG. 19 which relate to a particular jet-to-forward speed ratio, $\Delta V/V$. In curves A, B, and C of FIG. 19, propulsive efficiency is plotted against nozzle angle for internal efficiencies of 100%, 95% and 90%. Considering the 95% curve, it may be seen that propulsive efficiencies of from 50 to substantially 60% may be realized within a nozzle angle range of from 30° to 70°. The optimum angle appears to be substantially 45° for angle $\theta$. However, it will be appreciated that substantially the same efficiency which is obtainable at a nozzle angle of 45° may be obtained at nozzle angles varying as much as 10° from the 45° angle.

Although specific shapes, dimensions, and materials have been described in explanation of the illustrated embodiments, variation may be made in such details without deviating from the principles of the invention. For example, an axial flow pump may be substituted for the centrifugal pump as shown in FIGURES 1 through 15. It is therefore to be understood that within the scope of the appended claims, the invention may be practiced otherwise than as specifically described.

I claim:
1. A propulsive device for a water vehicle comprising impeller means positioned at the stern and above the waterline of said vehicle, rotary power means in said vehicle connected by shaft means to said impeller means, conduit means extending from said impeller means to substantially the waterline, said conduit means receiving said shaft means and angled near the point of reception to form a direct flow path therefrom to said impeller means, inducer means attached to said shaft means intermediate said impeller means and said point of reception, vane means positioned intermediate said inducer means and said impeller means for straightening flow into the impeller means, turning vane means positioned across the angled portion of said conduit means for directing flow toward said inducer means, intake means connected to said conduit means and having an inlet positioned below the surface of the water, said intake means including a plurality of vane means extending across the inlet to intercept debris and direct water into said conduit means, said intake means having flange means spaced from the bottom of said vehicle to bypass air and debris, and said impeller means having restricted outlet means adjacent the outer periphery thereof.

2. The device claimed in claim 1 wherein the restricted outlet means of said impeller means comprises a plurality of orifices disposed annularly therein and inclined at an angle of from substantially 30 to substantially 70 degrees to a plane perpendicular to the axis of rotation of said impeller means in a direction opposite to the direction of rotation thereof whereby increased propulsive efficiencies may be realized.

References Cited by the Examiner

UNITED STATES PATENTS

| | | | |
|---|---|---|---|
| 1,498,919 | 6/1924 | Jensen | 60—55.5 |
| 3,007,305 | 11/1961 | Hamilton | 60—35.54 |
| 3,055,175 | 9/1962 | Clark | 60—35.5 X |
| 3,064,616 | 11/1962 | Dowty. | |
| 3,082,732 | 3/1963 | Stallman | 103—82 X |
| 3,116,602 | 1/1964 | Dahle | 60—35.54 |

FOREIGN PATENTS

| | | |
|---|---|---|
| 812,914 | 2/1937 | France. |
| 902,229 | 10/1954 | Germany. |
| 22,381 | 1906 | Great Britain. |
| 494,608 | 5/1954 | Italy. |

OTHER REFERENCES

Robberson: "Wet Jet Propulsion," Yachting Magazine, volume 106, No. 5, pages 70–71, November 1959.

MARK NEWMAN, *Primary Examiner.*

SAMUEL LEVINE, *Examiner.*

T. BLUMENSTOCK, A. L. SMITH, *Assistant Examiners.*